(12) United States Patent
Kleinsasser

(10) Patent No.: US 6,508,202 B2
(45) Date of Patent: Jan. 21, 2003

(54) BOAR CART FOR INSEMINATION OF SOWS

(75) Inventor: Jonathan Kleinsasser, Ste. Agathe (CA)

(73) Assignee: Conception Romain Inc., St. Bernard (CA)

(*) Notice: Subject to any disclaimer, the term of this patent is extended or adjusted under 35 U.S.C. 154(b) by 0 days.

(21) Appl. No.: 09/781,087

(22) Filed: Feb. 20, 2001

(65) Prior Publication Data

US 2001/0027752 A1 Oct. 11, 2001

Related U.S. Application Data

(62) Division of application No. 09/412,517, filed on Oct. 5, 1999, now Pat. No. 6,336,426.

(51) Int. Cl.$^7$ .............................................. A01K 31/07
(52) U.S. Cl. ...................................................... 119/453
(58) Field of Search ................................ 119/453, 502, 119/503, 504–509, 751, 752, 847–849

(56) References Cited

U.S. PATENT DOCUMENTS

| | | | |
|---|---|---|---|
| 1,381,892 A | | 6/1921 | Bute |
| 1,483,377 A | * | 2/1924 | Ragsdale .................. 119/502 |
| 2,729,196 A | | 1/1956 | Breitenbach |
| 2,821,165 A | | 1/1958 | Wright |

(List continued on next page.)

FOREIGN PATENT DOCUMENTS

| | | | |
|---|---|---|---|
| CA | 2135623 | | 3/1994 |
| CA | 2270319 | * | 4/1999 |
| CA | 2270319 | | 8/1999 |

OTHER PUBLICATIONS

Photographs (2) of a machine installed in Iowa in 1997.
Brochure entitled "Swine Robotics Jerome Mack" including a photograph entitled Robotic Boar Buddy.
Photographs (2) of a machine built in Niverville, Manitoba, Canada and used at Select Weanling in Manitoba, Canada in 1998.
Photographs (3) of a machine displayed at a Trade Show in Winnipeg Manitoba, Canada in Dec. 1998 by Danny Kleinsasser.

*Primary Examiner*—Thomas Price
(74) *Attorney, Agent, or Firm*—Adrian D. Battison; Michael R. Williams; Ryan W. Dupuis

(57) ABSTRACT

A boar cart for carrying a boar through alleyways of a sow insemination area for interaction with the sows during insemination is formed by a cage for containing the boar including a cage floor on which the boar stands, two sides each defined by vertical bars on a respective side of a longitudinal center line of the cage assembly for confining the boar so that the boar is maintained extending longitudinally of the cage, a front and a rear defined by vertical bars, at least one of which can be opened as a door to allow entry and exit. The cage is mounted on rear driving wheels and front steering/caster wheels. The cage is defined by a front portion and a rear portion connected together for pivotal articulated movement about one or two pivot couplings defining a vertical pivot axis arranged substantially at the center line such that the cage can articulate to the left and to the right for navigating left and right corners in the alleyways while the boar is retained in the cage. The length of the cage is reduced by bowing the front and rear bars. The front steering wheels can be set to direct the steering slightly to the left or right so as to tend to guide the cage along one or other side of the alley where it has rollers to run along a rail and hold the boar close to the sows on one side.

6 Claims, 6 Drawing Sheets

U.S. PATENT DOCUMENTS

| | | |
|---|---|---|
| 3,785,344 A | 1/1974 | Patterson |
| 4,048,959 A * | 9/1977 | Steele ..................... 119/512 |
| 4,171,682 A | 10/1979 | Merino et al. |
| 4,202,292 A * | 5/1980 | Strickland ................ 119/502 |
| 4,348,986 A * | 9/1982 | Marrs ..................... 119/508 |
| 4,533,008 A | 8/1985 | Ostermann |
| 4,763,606 A | 8/1988 | Ondrasik, II |
| 4,955,318 A | 9/1990 | Melhorn et al. |
| 4,995,335 A * | 2/1991 | Wright ..................... 119/738 |
| 5,048,460 A | 9/1991 | Sheaffer |
| 5,113,793 A | 5/1992 | Leader et al. |
| 5,170,746 A | 12/1992 | Roose |
| 5,467,734 A | 11/1995 | Ho |
| 5,653,194 A | 8/1997 | Guy |
| 5,671,697 A | 9/1997 | Rutman |
| 5,998,110 A | 12/1999 | Peterson |
| 6,196,975 B1 * | 3/2001 | Labrecque et al. ......... 119/453 |

* cited by examiner

BOAR CART FOR INSEMINATION OF SOWS

This application is a divisional application from application Ser. No. 09/412,517 filed Oct. 5, 1999 which is now issued as U.S. Pat. No. 6,336,426.

This invention relates to a boar cart for use in transporting a boar adjacent to a series of pens containing sows during insemination of the sows.

BACKGROUND OF THE INVENTION

In high intensity rearing of pigs, sows after farrowing are moved to an area where they are maintained in separate pens awaiting insemination at the suitable time of estrous. The sows are maintained in separate pens in rows on one or both sides of dividing alleyways so that the farm hand can move along the row of sows both at the front and rear to access the sows for insemination and for various other purposes.

The alleyways between the rows can range in width from 18 inches up to 36 inches in most cases and in some cases the alleyways are wider still. The alleyways are defined between rows of pens and of course at the end of the rows the alley turns through a right angle so that passage can be obtained along one end of the rows and then back between the next set of rows where another right angle turn is required.

It is well known in artificial insemination that it is desirable to bring a boar to the sows both for the purposes of stimulating the sows by close physical contact with the boar and for determining whether a particular sow is in estrous. The presence of the boar is known to improve the effectiveness of the artificial insemination both by allowing the farm hand to more accurately determine the presence of estrous and in addition to place the sow in a more accepting condition for the insemination.

Conventionally a boar is led along the front of the stalls so as to physically contact or approach each sow in turn while the farm hand takes the necessary actions for carrying out insemination of those sows found to be in estrous. This requires the manual handling of a very large powerful animal by one or more additional farm hands.

Attention has therefore been given to design a device which allows the boar to be moved or transported along the alleyway in front of the row of sows in their pens while the farm hand carries out the necessary actions for insemination. It is clearly desirable if such a device is remotely controllable so that the farm hand at the rear of the animal can operate the device to move the boar to the required position adjacent the sow involved.

SUMMARY OF THE INVENTION

It is one object of the present invention to provide an improved boar cart and to provide an improved method using the boar cart.

According to the invention therefore there is provided a boar cart for carrying a boar through alleyways of a sow insemination area for interaction with the sows during insemination is formed by a cage for containing the boar including a cage floor on which the boar stands, two sides each defined by vertical bars on a respective side of a longitudinal center line of the cage assembly for confining the boar so that the boar is maintained extending longitudinally of the cage, a front and a rear defined by vertical bars, at least one of which can be opened as a door to allow entry and exit. The cage is mounted on rear driving wheels and front steering/caster wheels. The cage is defined by a front portion and a rear portion connected together for pivotal articulated movement about one or two pivot couplings defining a vertical pivot axis arranged substantially at the center line such that the cage can articulate to the left and to the right for navigating left and right corners in the alleyways while the boar is retained in the cage. The length of the cage is reduced by bowing the front and rear bars. The front steering wheels can be set to direct the steering slightly to the left or right so as to tend to guide the cage along one or other side of the alley where it has rollers to run along a rail and hold the boar close to the sows on one side.

BRIEF DESCRIPTION OF THE DRAWINGS

Embodiments of the invention will now be described in conjunction with the accompanying drawings in which.

DETAILED DESCRIPTION

Figure 1:
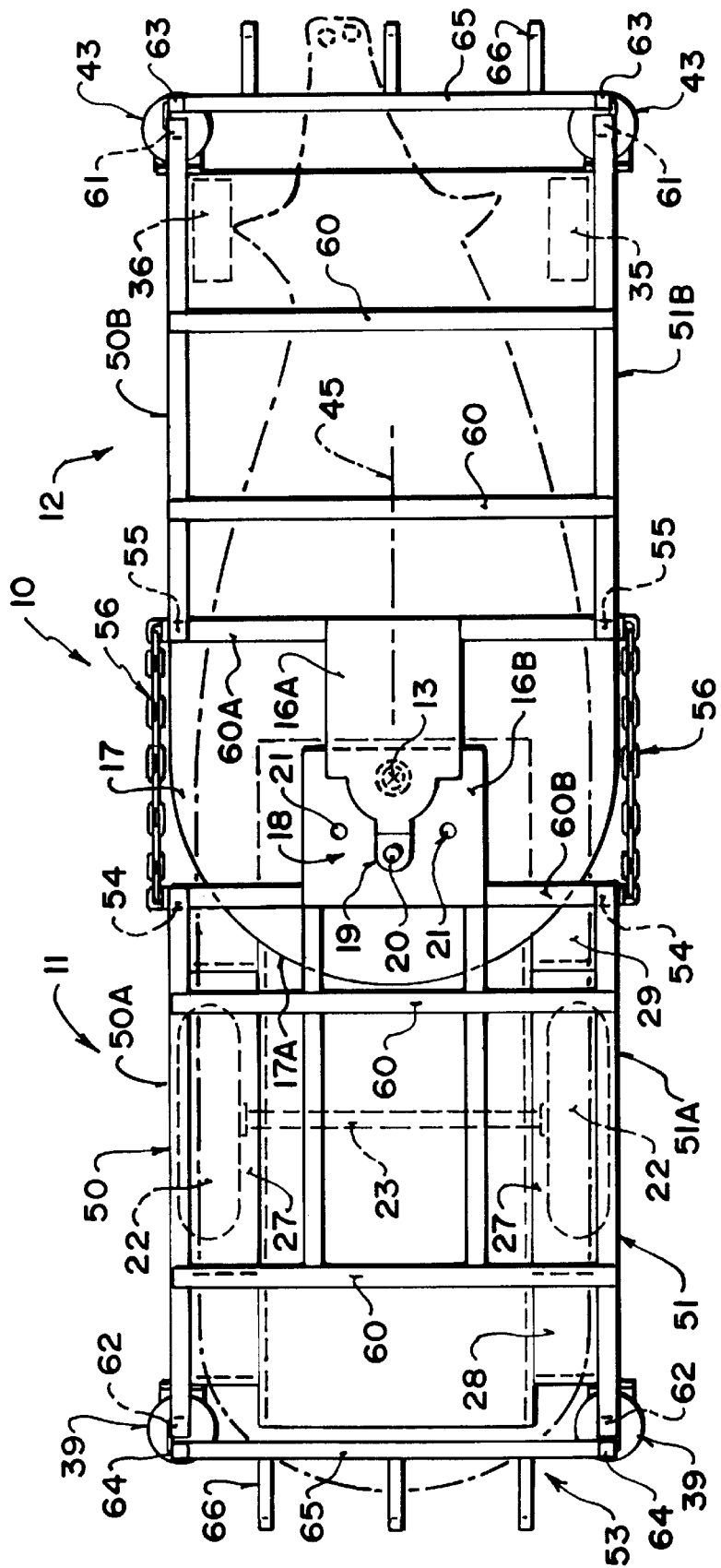
FIG. 1 is a top plan view of a first embodiment of cart according to the present invention showing the cart in the straight ahead position.
Figure 2:
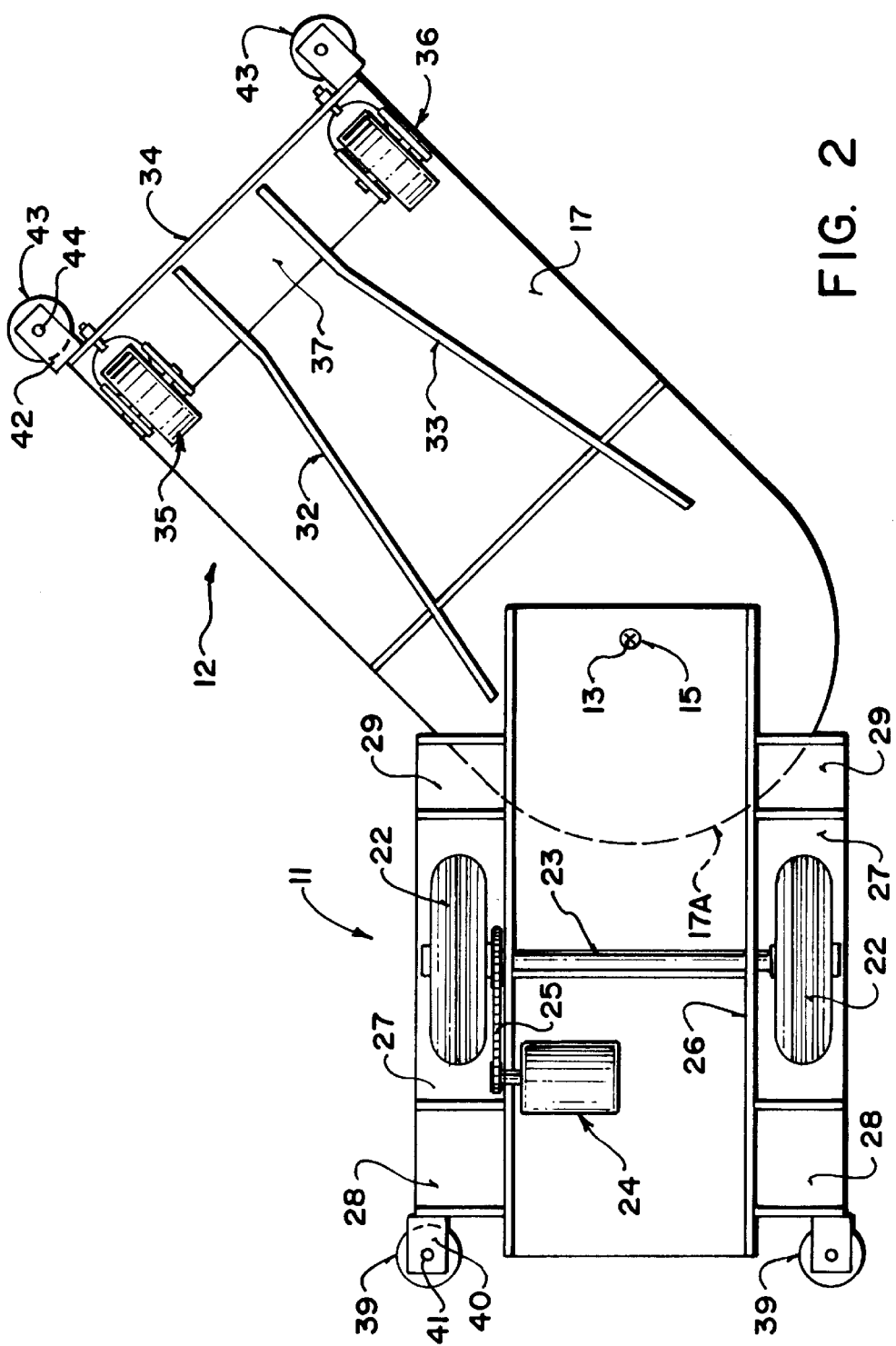
FIG. 2 is a bottom plan view of the cart of FIG. 1 with the cart in its position turned to one side for navigating a righthand corner.
Figure 3:
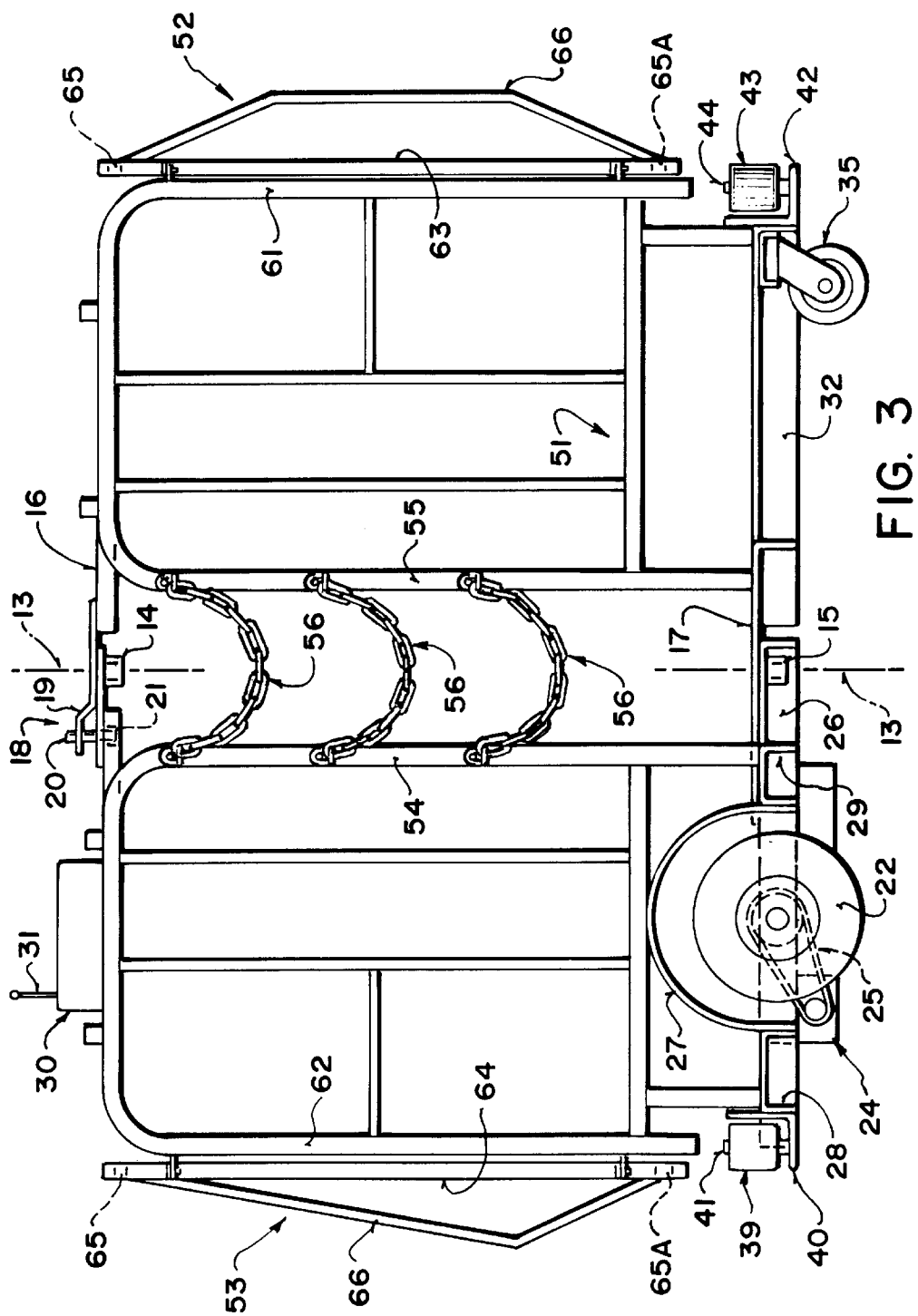
FIG. 3 is a side elevational view of the cart of FIG. 1.

A boar crate is generally indicated at 10 and includes a rear section 11 and a front section 12 which are articulated at a vertical pivot axis 13 allowing the front section to move from a straight ahead aligned position shown in FIG. 1 to either a lefthand or righthand turned position, one of which is shown in FIG. 2.

The pivot axis 13 is defined by a top bearing 14 in overlapping top panels 16 of the cart and a bottom bearing 15 in overlapping bottom floor panels 17 of the cart.

The front and rear portions can be locked in the straight ahead position shown in FIG. 1, and preferably in the left and right turned positions, by a pin lock system 18 including an arm 19 connected to the front portion which extends rearwardly over the rear portion to a pull pin 20 which engages into one of three separate holes 21 at the three separate positions. The pull pin 20 is spring biased into a locked position and is moved against the spring bias to a pulled position manually as required.

The rear section 11 is mounted on a pair of drive wheels 22 carried on an axle 23. One or both of the drive wheels is driven by a motor 24 communicating through a drive chain 25 mounted at or beneath the floor 17. The wheels 22 are mounted each on a respective side of a main longitudinal rail 26 of the section 11 with each wheel being covered at its position outside of the respective rail 26 by a fender 27. The fenders 27 each extend between frame channel members 28 and 29 extending outwardly from the rails 26 to a respective side. Between the rails 26 is defined a floor on which the rear part of the animal and the rear legs of the animal stand.

The motor 24 is controlled by an electrical control system 30 provided within a housing on the top 16 of the cart. The electrical control system 30 includes an antenna 31 which receives communications from a remote control system using a suitable communication medium so that the farm hand can remotely operate the cart to drive the wheels 22 forwardly and rearwardly as required. The wheels 22 are not steering wheels and simply drive the cart forwardly and rearwardly.

The front section 12 includes a planar floor panel 17 which is supported by rails 32 and 33 extending rearwardly from a forward edge 34 of the floor panel and diverging outwardly so as to leave a rear area of the floor panel 17 at the bearing 15 which overlies a front rectangular section of the floor 17 of the rear portion of the cart. A rear edge of the floor panel 17 of the front section defines a semi circular rear line 17A surrounding the bearing 15 and the axis 13 and this rear portion can therefore sweep over the top surface of the rear floor panel and moves in front of the wheels 22 and in front of the fenders 27.

The front portion 12 is mounted on a pair of castor wheels 35 and 36 carried on the underside of a transverse brace 37 at the front edge 34. Thus the direction of movement of the cart is controlled by the castor wheels as described hereinafter.

The rear channel members 28 of the rear section 11 each carry a bumper or guide roller 39 which is carried on a bracket 40 allowing rotation of the guide roller about a vertical mounting pin 41. Similarly a bracket 42 on the brace 37 carries a front bumper roller 43 pivotal about a vertical pin 44. The bumper rollers 39 and 43 are thus mounted at a common height on the front and rear portions and project outwardly therefrom slightly to each side and at a position in front of and rearwardly of respectively the front and rear edges of the floor panels 17.

The bumper rollers 39, 43 are mounted at a height which coincides with a suitable rail on the pens at the side of the alleyway against which or adjacent which the cart is intended to run.

The pivot axis 13 is arranged so that it lies on or adjacent a center line 45 of the cart in its aligned position shown in FIG. 1. The axis 13 is also approximately midway between the front edge 34 of the front portion and the rear edge of the rear portion. Thus the pivotal action provides articulation of the two portions to a position which the angle of the center line of the front portion is arranged approximately at 45° to the center line of a rear portion. This is of course symmetrical in both left and right directions in view of the fact that the pivot axis lies on the center line.

The cart is further formed by two side walls 50 and 51 the front wall 52 and a rear wall 53. Each of these walls is formed by bars allowing visual and direct physical access to the animal within the cart over the full area of the cart both to the rear, the front and the sides. The side walls are divided into two sections such that the rear portion 11 has its own side wall section 50A, 51A and the front section has its own side wall section 50B, 51B. The side wall 51A terminates at a front post 54 and the side wall 51B terminates at a rear post 55 with those posts separated rearwardly and forwardly respectively of the pivot axis 13. There is no direct rigid connection between the posts 54 and 55 so that the pivotal action about the axis 13 allows the post 54 and 55 to move closer together as the cart articulates to one side and to move further apart as the cart articulates to the other side. The post 54 and 55 are however connected by loose flexible chains 56 which have respective ends connected to the respective posts and which hang down as a loose connection bridging the space between the posts and acting the confine the animal in the area between the post to ensure that the animal is prevented from escape between the posts.

The side walls including the main mounting posts are attached to the floor so as to stand upwardly therefrom adjacent the outermost edge thereof and particularly the rear side walls stand upwardly from the outer edge of the portions 28 and 29. The top of the side rails are connected by transverse bars 60 which maintain the side walls in fixed vertical position and also provide a top or roof structure again providing the animal and prevent it from jumping upwardly to attempt to escape over the side walls. The top bearing 14 is connected to overlapping panels 16A and 16B carried respectively by a rear rail 60A of the front part and a front rail 60B of the rear part. The cage assembly may include flat closed panels covering or replacing the bars for additional strength if required.

The front wall 52 and the rear wall 53 are both formed as separate pivotal elements attached to a front post 61 of the front section and to a rear post 62 of the rear section respectively. Thus the front wall 52 includes two side posts 63 which can be pinned to respective ones of the posts 61 to hold the front wall fixed in place. Similarly the rear wall 53 includes posts 64 which can be pinned to the post 62 to hold the rear wall in place. One of or both of the front and rear walls can be removed by simply removing the pins so that the wall can be totally removed or can be removed at one side or disconnected from its respective post and pivoted away from the other post to allow access for entry or exit of the animal. Preferably both the front and rear walls are pivotal for removal in this manner so as to allow the animal to enter from the rear and exit from the front.

The front and rear walls further include top and bottom rails 64 and 65 respectively which extend across horizontally and interconnect the posts. Furthermore, the front and rear walls further include confining bars 66 which extend generally vertically downwardly from the top rail 64 to the bottom rail 65. Each of these bars 66 is bowed outwardly from the main plane containing the rail 64 and 65 so that a center section of the bars above the floor projects outwardly from the plane of the wall so as to increase the area within the cart which is accessible for the animal at the height of the rump and the nose of the animal which is approximately midway at the height of the cart and spaced upwardly from the floor. This bowing of the front and rear gates thus allows a reduction in the length of the whole of the cart thus reducing the distance between the front edge of the front section and the rear edge of the rear section and reducing the distance between the bumper rollers 39 and 43 so that the overall length of the cart is significantly reduced while the length of animal which can be accommodated between the outermost points of the bar 66 remains equal to the required length depending upon the size of the animal.

As shown in FIG. 1, the boar is schematically within the cart and, although the size of the boars used will of course vary, the cart is designed to take effectively the largest type of boar which would be used and this boar would wholly fill the cart so that its sides touch the side walls, its rump reaches the outwardly bowed section of the bar 66 at the rear of the rear section and its nose projects through or just reaches the bars 66 at the front of the front section. The animal is thus wholly contained and confined and the cart has dimensions which are significantly greater than the size of the animal itself.

Figure 4:
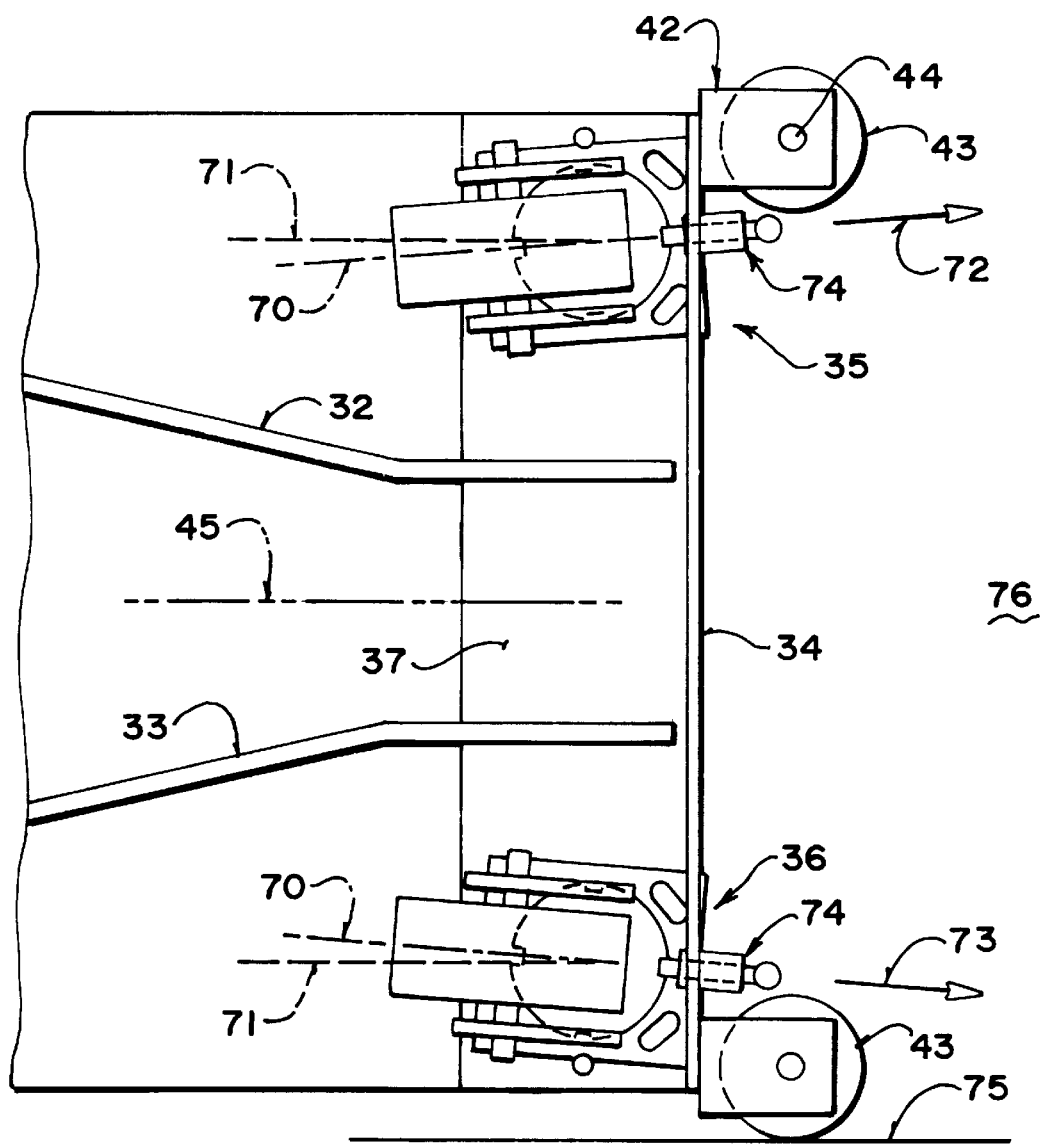
FIG. 4 is a bottom plan view similar to that of FIG. 2 showing more detail of the front steering/caster wheels.

Turning now to FIG. 4, further detail of the castor wheels 35 and 36 is shown. It will be noted firstly that the castor wheels are mounted on the underside of the cross brace 37 such that the normal forward direction 70 of the castor is offset at a slight angle to the longitudinal direction 71 of the cart which is parallel to the center line 45. Thus the lefthand castor wheel 35 is normally inclined slightly outwardly in a direction forwardly and outwardly as indicated at 72 and the castor wheels 36 is similarly inclined slightly forwardly and outwardly as indicated at 73.

Each castor wheel can be locked in its normal forward direction by a locking pin 74 of a type which is commercially available so that the castor 35, 36 can be locked in its forward direction, 72, 73 or can simply castor as required depending upon the position of the lock 74.

In operation, if it is required that the cart remain alongside the side rail 75 adjacent the castor 36, the castor 36 is locked and the castor 35 is released to be free to castor. Thus both castor wheels will take up a position normally tending to move along the direction 73 thus tending to push the cart as it moves forwardly toward the rail 75 on one side of the alley 76.

Therefore in a situation where there are sows on both sides of the alley 76, the farm hand can select that side of the alley to which the cart tends to move by locking the wheel on that side and releasing the wheel on the other side. Thus as the cart moves forwardly it also tends to push toward one side so that the bumper rollers on that side tend to run along the rail 75.

In some cases the alley is relatively narrow so that the cart in effect just fits between the rails and moves along the alleyway equidistant from each of the rails. In this case both wheels may be set to caster.

However in other arrangements, the alleyway may be significantly wider and it is therefore desired to hold the cart to the side adjacent those sows which are being operated upon by the farm hand. Thus this simple steering system avoids the necessity for remote controlled steering and simply ensures that the cart remains adjacent the required side of the alleyway. The bumper rollers hold the cart at the required position and gently guide the cart as it moves along the alleyway. It will be appreciated that the movement of the cart is very slow in that the cart is often maintained stationary for a period of time and then stepped forward to a next pen of the next adjacent sow.

Figure 5:
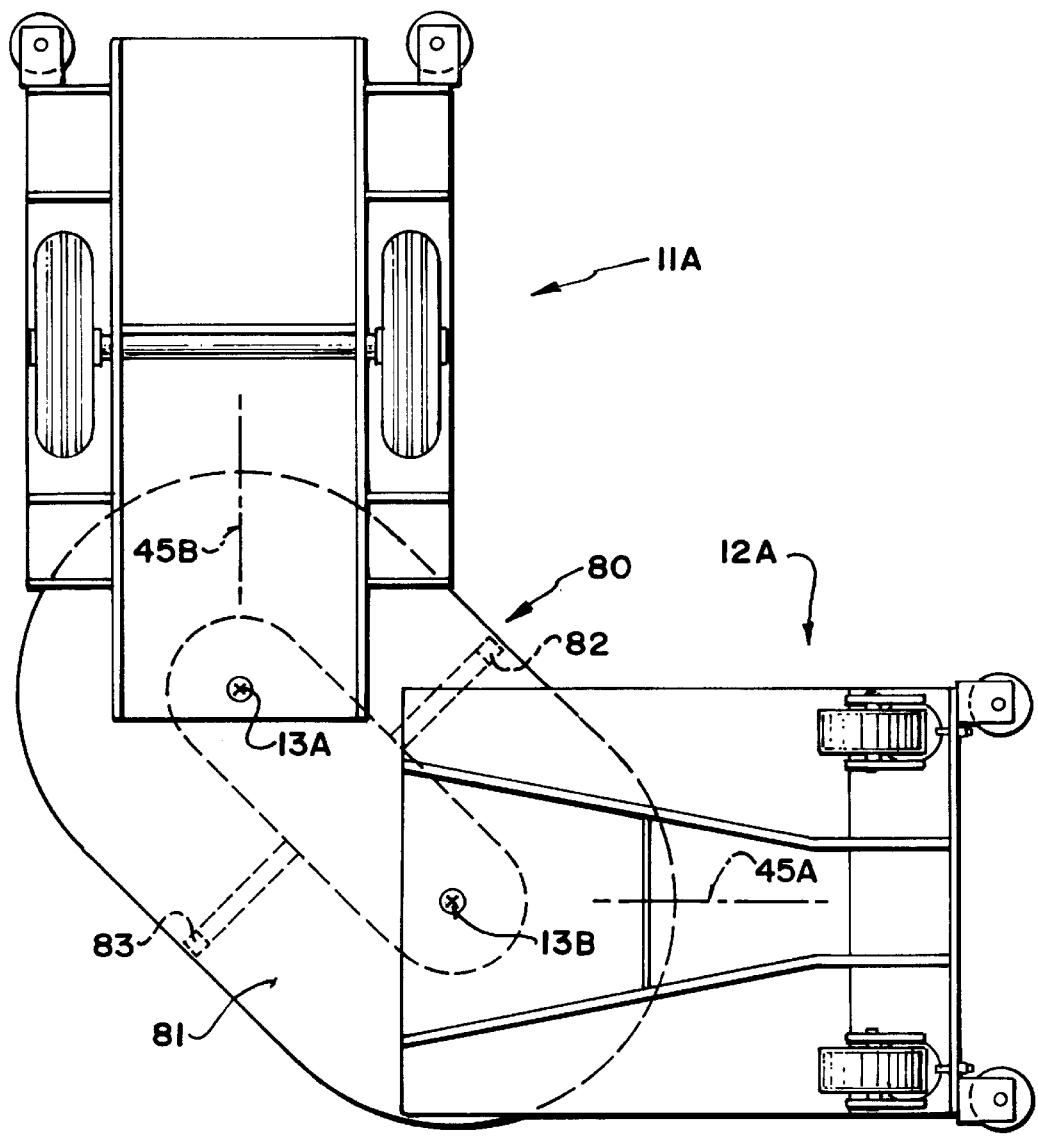
FIG. 5 is a bottom plan view similar to that of FIG. 2 showing a second embodiment according to the present invention.

Turning now to FIG. 5, there is shown an arrangement which is substantially identical to that of FIGS. 1 through 4 except that the front section 12A is articulated relative to the rear section 11A by two pivot axes 13A and 13B. This is effected by the provision of an intermediate section 80 defined by a floor panel 81 and two vertical posts 82 and 83 connecting to a top structure 85. Thus the axes 13A and 13B are again defined by top and bottom bearings at the floor panel 81 and at the top panel 85.

The double articulation arrangement of FIG. 5 thus allows an increased angle between the front section and the rear section in the articulated position and in particular an arrangement in which the center line 45A of the front section lies at 90° to the center line 45B of the rear section. This of course requires the animal to accommodate a larger angle of bend between its rear and its front section but this allows the cart to move more effectively around a right angle corner particularly where the alleyways are very narrow.

The arrangement has the advantage therefore that the animal can be maintained within the cart at all times while the cart is moved along alleyways and round corners onto the next adjacent alleyway and there is no necessity to remove the animal with the difficulty of returning it to its position should it have any reluctance. The animal is therefore always confined and can be handled by a single farm hand by the remote operation while the farm hand operates upon the sows in conventional manner.

In an alternative arrangement (not shown) the pivot coupling is offset from the center line but this arrangement is less advantageous in that it may be necessary to remove the boar from the cart to navigate certain or all corners.

Figure 6:
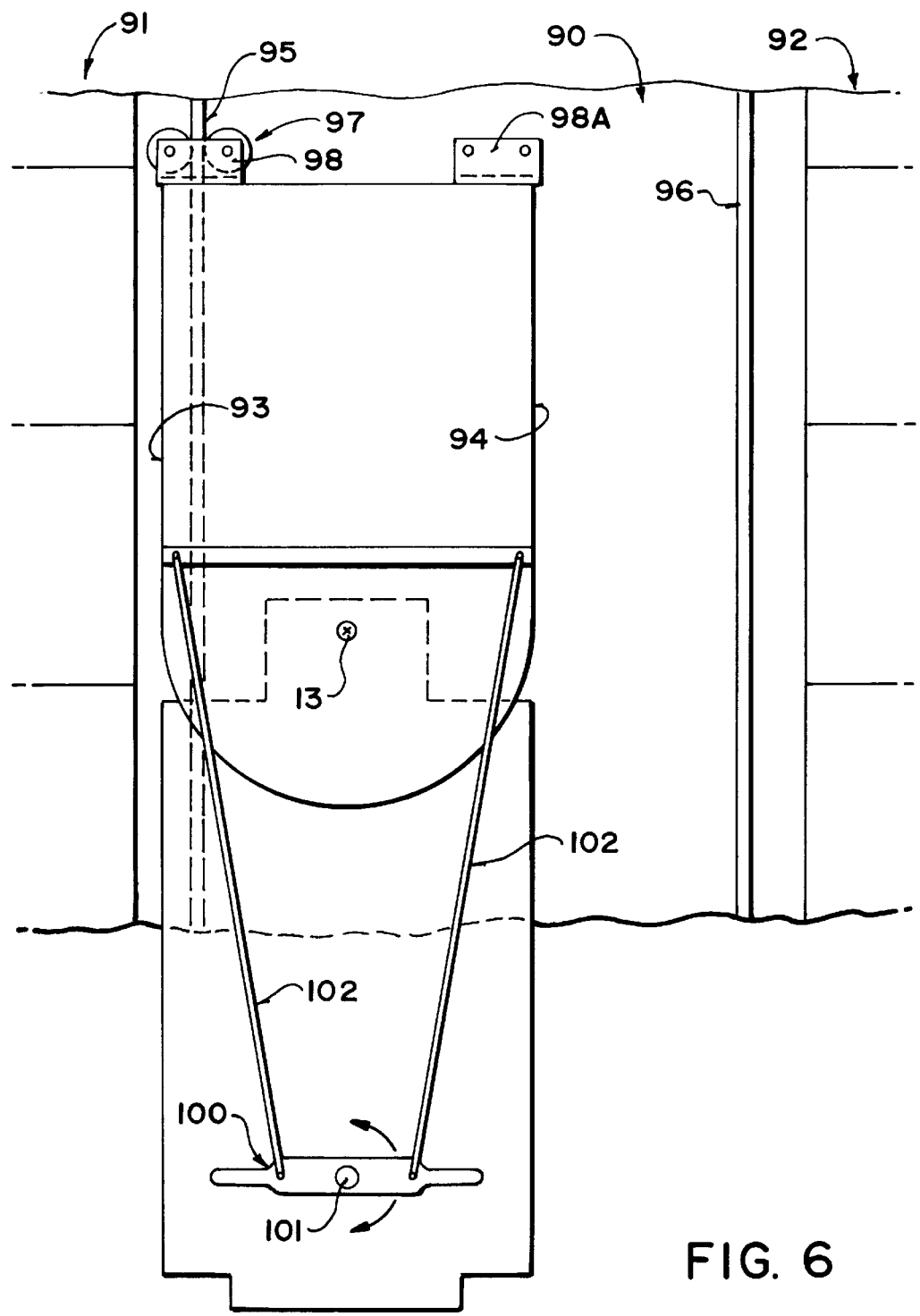
FIG. 6 is a top plan view similar to that of FIG. 4 showing a further embodiment according to the present invention.

Turning now to FIG. 6 there is shown in top plan view schematically an alleyway 90 having a first row of pens 91 on one side and a second row pens 92 on the other side of the alleyway. The width of the alleyway is greater than the width of the cart so that the cart can be adjusted so that it runs with one side 93 adjacent the pen 91 and the other side 94 spaced away from the pens 92 and by vice versa.

Various arrangements for guiding the movement of the cart along the respective selected side can be provided including the arrangement shown previously in FIG. 4. However an alternative arrangement is shown in FIG. 6 and this includes a pair of guide tracks 95 and 96 which are provided in the alleyway at a suitable location and preferably adjacent the respective line of pens. The cracks 95, 96 and be provided by raised rails cast in or attached to the concrete of the alleyway or can be provided by another ridge or groove in the concrete which thus forms a continuous line or track along the concrete for holding the cart along a predetermined line adjacent the respective selected side.

In the embodiment shown, the track 95 or 96 is followed by a pair of rollers 97 which are attached to the cart on a bracket 98 which can be moved from the lefthand position shown to a righthand position 98A to guide the cart along the selected one of the tracks 95, 96.

Also in FIG. 6 is shown a steering arrangement which can be used by a person walking behind the cart at the corner between an alleyway and an end alley to direct the cart around the corner. Thus a lever arrangement 100 is provided on the top of the rear cart section which in the example shown is in the form of handlebars which can pivot about a vertical pivot axis 101. The lever connects by two directly extending cables 102 to respective sides of the front cart section thus acting to pull the front cart section to the required steering direction to effect the turn around the corer as the cart moves slowly forward. This can be effected by a single operator from behind without moving or disturbing the boar in the cart and without undue physical effort. The simple cables can be replaced by more complex linkage such as cable and pulley arrangements or chains driving a sprocket centered on the pivot axis 13. The handlebars can be replaced by other lever arrangement or by a manual or motor driven winch which pulls the cables or chain.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for carrying a boar along an alleyway of a sow insemination area for interaction with sows on at least one of two sides of the alleyway during insemination comprising:

providing two rows of sows in pens each row on a respective side of an alleyway;

locating the boar within a cage assembly including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

mounting the cage assembly on ground wheels for movement generally longitudinally along the alleyway carrying the boar within the cage assembly;

providing on the cage assembly a guide arrangement arranged to cooperate with at least one member in the alleyway for guiding the cage assembly along the alleyway;

operating the guide assembly in a first adjustment position thereof to select one of the sides of the alleyway and to guide the cage assembly so that the cage assembly runs, while in the first adjustment position, continually along the alleyway at a position in the alleyway adjacent to that one side and spaced from the other of the sides;

and subsequently operating the guide assembly out of the first adjustment position into a second adjustment position thereof to select the other of the sides of the alleyway and to guide the cage assembly so that the cage assembly runs, while in the first adjustment position, continually along the alleyway at a position in the alleyway adjacent to the other of the sides and spaced from said one of the sides.

2. A method for carrying a boar along an alleyway of a sow insemination area for interaction with sows on at least one of two sides of the alleyway during insemination comprising:

providing two rows of sows in pens each row on a respective side of an alleyway;

locating the boar within a cage assembly including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

mounting the cage assembly on ground wheels for movement generally longitudinally along the alleyway carrying the boar within the cage assembly;

providing on the cage assembly a guide arrangement arranged to cooperate with at least one member in the alleyway for guiding the cage assembly along the alleyway;

arranging and adjusting the ground wheels to a first adjustment position thereof in which the ground wheels tend to direct the cage assembly so that the cage assembly runs continually, while in the first adjustment position, along the alleyway at a position in the alleyway adjacent a selected one of the sides of the alleyway and away from the other of the sides;

subsequently arranging and adjusting the ground wheels out of the first adjustment position to a second adjustment position thereof in which the ground wheels tend to direct the cage assembly so that the cage assembly runs continually, while in the second adjustment position, along the alleyway at a position in the alleyway adjacent the other one of the sides of the alleyway and away from said one of the sides;

and arranging the guide assembly for guiding the cage assembly in movement along that one of the sides toward which the cage assembly is directed.

3. The method according to claim 2 the ground wheels include at least one rear drive wheel connected to a motor for supporting the cage assembly and for driving the cage assembly along the alleyway and at least one front steering wheel for supporting the cage assembly and for guiding the cage assembly along the alleyway; and wherein the step of adjusting the ground wheels to the first and second adjustment positions includes adjusting and locking said at least one front wheel in a predetermined direction to tend to direct the cage assembly in movement toward the selected one of the sides of the alleyway; and wherein there is provided in the alleyway a guide element at the selected side of the alleyway and on the cage assembly side guide members for contacting the guide element at the selected side of the alleyway such that the cage assembly is directed toward and runs along the guide element at the selected side.

4. The method according to claim 3 wherein there are two front wheels and wherein the front wheels are arranged such that, when directed to one side, one wheel is locked and one wheel casters.

5. The method according to claim 4 wherein both wheels are selectably lockable and both are free to caster when unlocked.

6. The method according to claim 3 wherein the guide members comprise rollers.

* * * * *